Nov. 6, 1962

P. P. O'NEILL 3,062,239

TORSION TUBE VALVE

Filed June 29, 1960

INVENTOR
PHILIP P. O'NEILL

BY  *Harry J. McCauley*

ATTORNEY

United States Patent Office 3,062,239
Patented Nov. 6, 1962

3,062,239
TORSION TUBE VALVE
Philip P. O'Neill, Wilmington, Del., assignor to E. I. du Pont de Nemours and Company, Wilmington, Del., a corporation of Delaware
Filed June 29, 1960, Ser. No. 39,551
5 Claims. (Cl. 138—45)

This invention relates to a torsion tube valve, and particularly to a torsion tube valve for liquid service which employs a fluted, thin-walled metal tube as the flow regulative element.

Torsion tube valves are known to the art, a typical design being that taught in U.S. Patent 2,657,004; however, these have been restricted to the use of elastomeric materials or the equivalent and, in addition, have employed tubes of substantially circular cross-section, which affords an unfavorable hydraulic diameter value. As a consequence, torsion tube valves have not been widely utilized in practice and, with the exception of a few relatively minor low-pressure applications, the inherent advantages of the torsion tube principle have been largely lost to industry.

Figure 1:
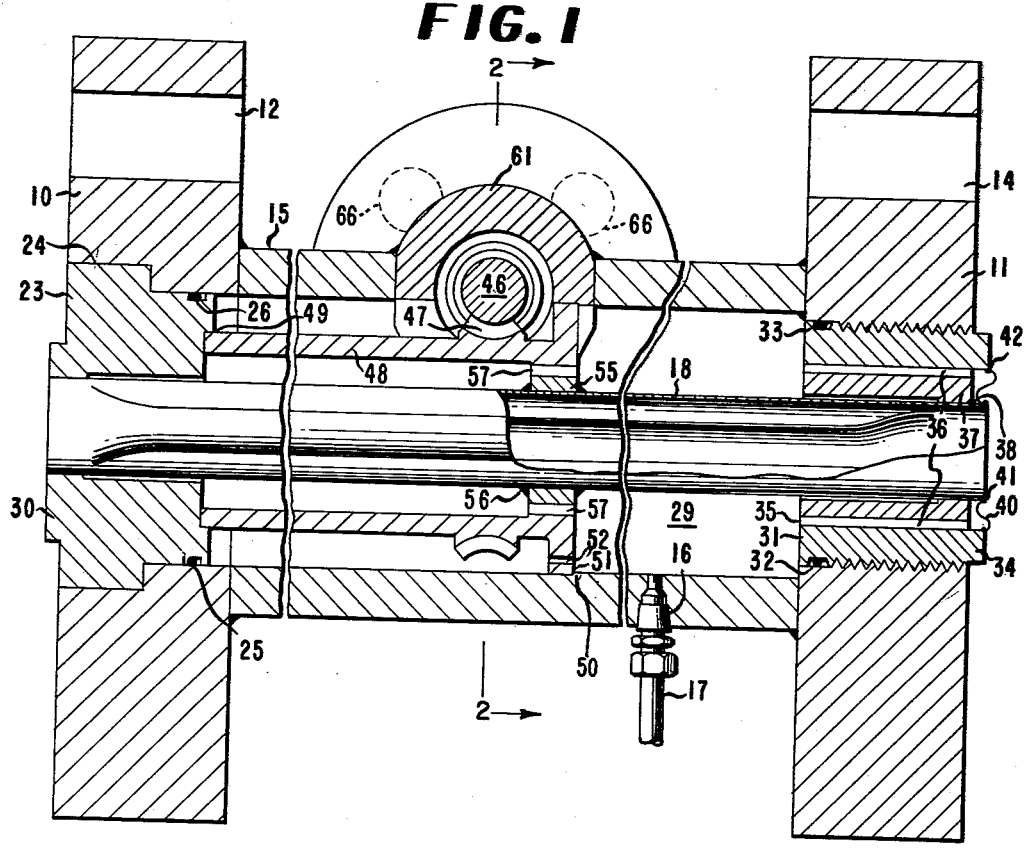
Figure 2:
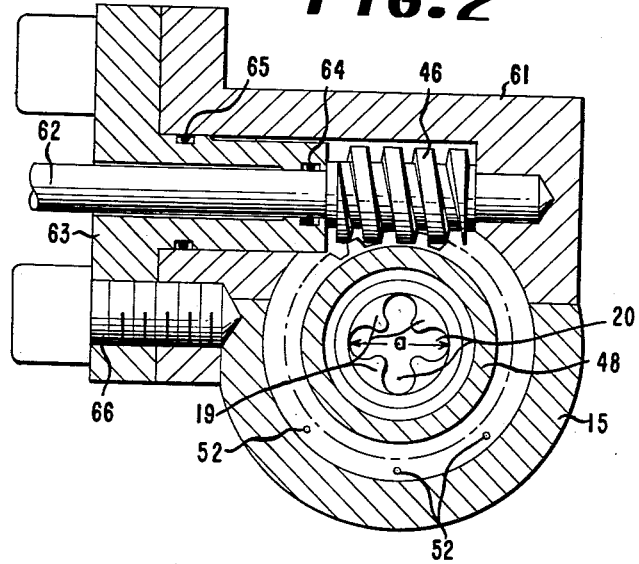

An object of this invention is to provide a high strength, torsion tube valve for liquid service employing a length of thin-walled metal tubing as the regulative element. Another object of this invention is to provide a torsion tube valve of greatly improved hydraulic diameter, and thus of expanded range of flow control. Yet other objects of this invention are to provide a torsion tube valve adapted to sealed construction throughout, one which can be backed up by reverse pressure and one which is simple and rugged in design. The manner in which these and other objects of this invention are attained will become apparent from the following description and the drawings, in which:

FIG. 1 is a longitudinal sectional view of a preferred embodiment of torsion tube valve according to this design, and FIG. 2 is a section on line 2—2 of FIG. 1.

Generally, the liquid valve according to this invention comprises the combination of a thin-walled metal tube of length no less than about ten times the maximum inside diameter thereof provided with longitudinal flutes substantially symmetrically disposed one with respect to another defining a multiplicity of mutually interconnecting internal passages adapted to preserve laminar liquid flow therethrough, and means in external contact with the tube disposed substantially mid-length thereof for torsionally deflecting the tube with respect to its longitudinal axis to thereby adjust the internal cross-section of the tube to a preselected degree regulative of liquid flow therethrough. For high pressure service it is preferred to mount the torsion tube within a closed housing to which is supplied liquid under pressure, which, by opposition to liquid pressure applied internal of the tube, contributes to the strength of the design, and this construction is described in detail in the following description, although it will be understood that the housing can be dispensed with if desired, particularly in low-pressure installations.

Referring to FIG. 1, a complete valve assembly is shown, comprising end flanges 10 and 11, each adapted to connection with companionate flanges constituting the end connections for a liquid flow line, not shown, by bolt attachment through passages 12 and 14, respectively, or by welding if desired. The pressure-backing housing consists of a generally cylindrical piece 15 welded firmly at each end to the inward ends of flanges 10 and 11. A connection 16 is provided for introduction of fluid under pressure supplied through line 17.

The torsion tube element consists of a straight length of metal tubing 18, which, in a typical construction, is type ASME SA–240 (identical with ASTM A240–58T) steel of 0.020" wall thickness, 18" in length, with a diameter across the maximum dimension, a of FIG. 2, of 1.50". For best performance, it is preferred to utilize a length of torsion tube no less than about ten times the maximum inside diameter of the tube and, in some uses, a length to diameter ratio of 20 to 30 is advantageous. Tube 18 is provided with four smoothly contoured flutes 19 disposed 90° apart around the circumference to a depth of about one-half the radius of the tube, thereby providing four interconnecting internal passages 20 which are adapted to preserve laminar liquid flow therethrough. The cruciform internal configuration described is particularly preferred because of the fact that there is thereby conferred improved flexibility of tube 18 in the rotational sense. This is because the configuration possesses a lower torsional moment of inertia than, for example, a circular cross-section tube, which results in a smaller torsional moment producing an equivalent pressure drop per unit length for equal cross-sectional areas, thus safeguarding the cruciform tube from over-stressing. An additional advantage is that the rate of change of hydraulic diameter, which latter is defined as the ratio of four times the area of a flow channel divided by its perimeter, is increased per unit of rotation in the cruciform tube, which therefore expands the range of regulation of flow through the tube correspondingly. This is an important advantage, since the pressure drop in laminar flow is inversely proportional to the square of the hydraulic diameter of the flow channel, so that an appreciable change in pressure drop can be readily effected by a relatively small change in flow passage area, particularly if the length of the perimeter remains constant, as it does here. The valve construction described herein in detail has a range of torsional deflection of tube 18 of 0–90°, which gives a flow regulation ranging from about 60 to about 25 in.$^3$/min. for a liquid in flow having a viscosity of about $8 \times 10^4$ poises.

While the cruciform cross-section tube is particularly preferred from the standpoint of ease of fabrication and good performance, it will be understood that either a lesser or a greater number of lobes 20 can be utilized, if desired, and that my invention is not limited to any specific cross-section of torsion tube.

It is preferred to dispose the point of torque application approximately mid-length of torque tube 18 in order to distribute the stress equally and, at the same time, confine it to a minimum level.

It is convenient to make up the valve assembly in the following manner. The left-hand end of tube 18 is fixedly secured, as by welding, to a stepped flange 23 seating snugly within a mating bore 24 provided centrally of flange 10. A conventional O-ring seal 25 is provided mounted within a recess 26 machined peripherally in the inner end of flange 23 to bar leakage from fluid under pressure confined within the annular space 29 existing between the inside of housing 15 and the exterior of tube 18. An external boss 30 is formed in the outer end of flange 23 which is adapted to engage within a mating recess in the liquid pipe line connector to which the valve is to be attached, so that a smooth continuous flow passage is insured in the transition from piping system to valve. The abutment of the pipe end against flange 23 anchors the left-hand end of torsion tube 18 firmly in place against both longitudinal and rotational movement; however, it is advantageous to restrain the opposite end, i.e., the right-hand end, against rotational movement solely, while permitting some longitudinal freedom to accommodate for changes in length accompanying torsional deflections of the tube.

Accordingly, the right-hand flange 11 is provided centrally with an externally threaded flange 31 coaxial with flange 23 and provided on the inner end with an O-ring seal 32 mounted within a peripherally machined recess 33. The outer end of flange 31 is provided with an unthreaded boss extension 34 identical with boss 30 and for the same purpose. Flange 31 is provided with an enlarged bore 35 within which are formed a multiplicity of longitudinal splines 36 which cooperate with mating grooves on the outside periphery of annular sleeve retainer 37, to which tube 18 is welded peripherally at 38. The right-hand end is sealed against leakage outwardly from space 29 by a conventional metallic diaphragm seal 40 joined by welding around the entire inside periphery to tube 18 at 41 and around the entire outside periphery to flange 31 at 42. This construction readily accommodates for longitudinal movement of the order of ⅛″ accompanying a maximum torsional deflection of 90° and is effective over an even greater range if desired.

A convenient arrangement for effecting torsional deflection of tube 18 utilizes a worm 46 driving a wheel 47 which latter is formed integrally with a long sleeve 48, the left-hand end of which is journaled in bore 49 of flange 23, whereas the right-hand end abuts loosely against shoulder 50 formed in the bore of housing 15. Sleeve 48 is thus completely free to rotate, while being retained against longitudinal displacement, and the flanged end 51 is preferably drilled through at a number of points 52 to permit easy ingress of the backing pressure fluid in space 29, if a liquid with lubricating properties, such as oil, is employed, to provide lubrication for the worm wheel.

Driving connection with tube 18 is effected through a gear 55 joined at the bore to the tube at substantially the mid-length point by welded attachment at 56, the teeth of which engage in high precision sliding fit with a multiplicity of splines 57 machined on the inner right-hand end of sleeve 48. Both splines 57 and gear 55 are of sufficient length in a longitudinal direction so that practically the same large driving surface is preserved therebetween regardless of the angular deflection of tube 18 and the consequent longitudinal displacement of gear 55 with respect to splines 57.

Worm 46 is conveniently introduced into the assembly by enclosure within a semi-circular weldment 61 joined at opposite ends to a transverse slot cut into housing 15. The drive shaft 62 is sealed against leakage by a conventional stuffing box, indicated generally at 63 and provided with internal and external O-ring seals 64 and 65, respectively. The flange of the stuffing box is attached by bolts 66 to the body of the valve assembly, making for easy replacement of seals or servicing should the necessity arise.

In operation, it will be understood that tube 18 is deflected torsionally a preselected amount through the agency of worm 46, thereby effecting an alteration of the hydraulic diameter of the flow channel through the tube, which regulates the flow of material therethrough within predetermined limits. The construction is particularly suited to the regulation of laminar flow of thick polymeric liquids and a typical installation is one involving molten thermoplastic which it is desirable to filter, as by use of a sand pack or the like, immediately prior to extrusion to remove any solid particles and, in general, to improve the quality of the product over that obtainable without a filter.

In such a case the resistance of the filter increases with service until, eventually, replacement of the filter must be had. However, during the entire service life the back pressure imposed by the filter varies in an unpredictable manner, which requires that a progressively greater amount of power be supplied to the extruder screw in the course of manufacture to maintain constant polymer delivery. It is exceedingly difficult to regulate the speed of the extruding screw supplying polymer to the die with the precision required for high quality production; however, the desired control can be readily and economically obtained by interposing a valve of design according to this invention within the line of flow between the extruder and the filter. In such an arrangement torsion tube 18 is deflected to its maximum flow-restrictive setting at the outset of production when the filter is new and thus possessed of its lowest flow resistance. Thereafter, as the resistance to polymer flow increases, the setting of the valve is gradually opened to maintain a substantially constant delivery pressure upstream of the filter to accommodate for gradual clogging of the interstices therethrough with the passage of time. Flow control as herein described is most advantageously obtained by the utilization of automatic pressure-responsive control equipment of conventional design, which gradually backs off the closure of the valve as demand requires; however, the valve is also adapted to manual control by turning a handwheel, or the like, if manual operation is desired. In either case it is desirable to adjust the ambient pressure of back-up fluid maintained within space 29 to preserve an optimum level relieving the thin-walled torsion tube 18 of all stresses except those imposed by the torsional deflection of flow regulation.

From the foregoing, it will be understood that the torsional valve of this invention can be modified in numerous respects without departure from the essential spirit of my invention, and it is intended to be limited only within the scope of the attached claims.

What is claimed is:

1. A liquid valve comprising in combination a thin-walled metal tube of length no less than about ten times the maximum inside diameter thereof provided with longitudinal flutes substantially symmetrically disposed one with respect to another defining a multiplicity of mutually interconnecting internal passages generally radial of said tube adapted to preserve laminar liquid flow therethrough and means in external contact with said tube substantially mid-length thereof for torsionally deflecting said tube with respect to its longitudinal axis to thereby adjust the internal cross-section of said tube to a preselected degree regulative of liquid flow therethrough.

2. A liquid valve according to claim 1 wherein said longitudinal flutes are four in number, defining between them a tubular cross-section of generally cruciform shape.

3. A liquid valve comprising in combination a closed housing, a thin-walled metal tube of length no less than about ten times the maximum inside diameter thereof provided with longitudinal flutes substantially symmetrically disposed one with respect to another defining a multiplicity of mutually interconnecting internal passages generally radial of said tube adapted to preserve laminar flow therethrough disposed within said housing, means disposed approximately mid-length of said tube and in external contact therewith for torsionally deflecting said tube with respect to its longitudinal axis to thereby adjust the internal cross-section of said tube to a preselected degree regulative of liquid flow therethrough, and means for introducing a fluid under pressure into said housing external of said tube.

4. A liquid valve according to claim 3 wherein both ends of said tube are restrained against rotational movement about the longitudinal axis of said tube by attachment to said housing.

5. A liquid valve comprising in combination a closed housing, a thin-walled metal tube of length no less than about ten times the maximum inside diameter thereof provided with longitudinal flutes substantially symmetrically disposed one with respect to another defining a multiplicity of interconnecting internal passages generally radial of said tube adapted to preserve laminar liquid flow therethrough, said tube being fixedly attached at one end to said housing and being provided with a spline connection with said housing at the other end permitting limited longitudinal freedom of movement of said tube while restraining said tube against rotation with respect to its longitudinal axis, means disposed approximately mid-length of said tube and in external contact therewith for torsionally deflecting said tube with respect to its longitudinal axis to thereby adjust the internal cross-section of said tube to a preselected degree regulative of liquid flow therethrough, and means for introducing a fluid under pressure into said housing external of said tube.

References Cited in the file of this patent

UNITED STATES PATENTS

| | | |
|---|---|---|
| 2,434,835 | Cooley | Jan. 20, 1948 |
| 2,657,004 | Lovington | Oct. 27, 1953 |
| 2,746,709 | Minor | May 22, 1956 |

FOREIGN PATENTS

| | | |
|---|---|---|
| 575,950 | Canada | May 19, 1959 |